(12) United States Patent
Adachi (10) Patent No.: US 11,572,054 B2
(45) Date of Patent: Feb. 7, 2023

(54) DRIVING SUPPORT APPARATUS

(71) Applicant: TOYOTA JIDOSHA KABUSHIKI KAISHA, Toyota (JP)

(72) Inventor: Masahiko Adachi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/682,826

(22) Filed: Feb. 28, 2022

(65) Prior Publication Data

US 2022/0289165 A1 Sep. 15, 2022

Related U.S. Application Data

(63) Continuation of application No. 16/835,880, filed on Mar. 31, 2020, now Pat. No. 11,285,935, which is a continuation of application No. 16/011,704, filed on Jun. 19, 2018, now Pat. No. 10,654,463.

(30) Foreign Application Priority Data

Jul. 26, 2017 (JP) .............................. JP2017-144189

(51) Int. Cl.
*B60W 10/18* (2012.01)
*B60W 30/095* (2012.01)
*G08G 1/16* (2006.01)

(52) U.S. Cl.
CPC ........ *B60W 10/18* (2013.01); *B60W 30/0956* (2013.01); *B60W 2520/105* (2013.01); *B60W 2555/60* (2020.02); *G08G 1/166* (2013.01)

(58) Field of Classification Search
CPC ............. B60W 10/18; B60W 30/0956; B60W 2555/60; B60W 2520/60; G08D 1/166
USPC .......................................................... 701/70
See application file for complete search history.

(56) References Cited

U.S. PATENT DOCUMENTS

| 9,463,794 B1* | 10/2016 | Silver ................ G01C 21/3602 |
| 10,654,463 B2* | 5/2020 | Adachi ................. B60W 10/18 |
| 2007/0021876 A1* | 1/2007 | Isaji .................... B60W 10/184 701/1 |
| 2010/0211247 A1* | 8/2010 | Sherony ............. B60W 40/076 701/1 |
| 2016/0318490 A1* | 11/2016 | Ben Shalom ... B60W 30/18154 |

(Continued)

FOREIGN PATENT DOCUMENTS

| JP | 2005063398 A | 3/2005 |
| JP | 2010-264841 A | 11/2010 |

(Continued)

*Primary Examiner* — Yazan A Soofi
(74) *Attorney, Agent, or Firm* — Sughrue Mion, PLLC (57) ABSTRACT

A driving support apparatus (12) has: a setting device (122) for setting a first target position (31) on the basis of a first sign object (21), if the first sign object requesting a vehicle (1) to stop is detected; and a supporting device (123) for performing a first deceleration control for decelerating the vehicle to a first target speed before the vehicle reaches the first target position, if a second sign object (22) representing a stop position is detected during a period when the first decelerating control is performed, the setting device sets a second target position (32) on the basis of the second sign object and the supporting device performs a second decelerating control for decelerating the vehicle to a second target speed before the vehicle reaches the second target position.

18 Claims, 5 Drawing Sheets

(56) References Cited

U.S. PATENT DOCUMENTS

| | | | |
|---|---|---|---|
| 2016/0375775 A1* | 12/2016 | Imanishi | B60W 30/18127 701/70 |
| 2019/0031174 A1 | 1/2019 | Adachi | |
| 2020/0223421 A1 | 7/2020 | Adachi | |

FOREIGN PATENT DOCUMENTS

| | | |
|---|---|---|
| JP | 2013196639 A | 9/2013 |
| JP | 2016-122362 A | 7/2016 |

* cited by examiner

DRIVING SUPPORT APPARATUS

CROSS REFERENCE TO RELATED APPLICATION

This application is a continuation of U.S. application Ser. No. 16/835,880 filed Mar. 31, 2020 (allowed), which is a continuation of U.S. application Ser. No. 16/011,704 filed Jun. 19, 2018 (now U.S. Pat. No. 10,654,463 issued May 19, 2020), which claims benefit from Japanese Patent Application No. 2017-144189 filed Jul. 26, 2017. The entire disclosures of the prior applications are considered part of the disclosure of the accompanying continuation application, and are hereby incorporated herein by reference in its entirety.

TECHNICAL FIELD

The present invention relates to a technical field of a driving support apparatus that is configured to perform a driving support for automatically decelerating a vehicle to a target speed before the vehicle reaches a target position, for example.

BACKGROUND ART

A Patent Literature 1 discloses one example of a driving support apparatus. Specifically, the Patent Literature 1 discloses the driving support apparatus that is configured to extract a road sign requesting the vehicle to stop or a stop line (a halt line) from an image ahead of (in front of) the vehicle that is captured by a camera, then to calculate a stop position (namely, a target position) on the basis of either one of the extracted road sign and stop line, and then to stop the vehicle at the calculated target position.

Note that there is a Patent Literature 2 as another document relating to the present invention.

CITATION LIST

Patent Literature

[Patent Literature 1] Japanese Unexamined Patent Application Publication No. 2005-063398
[Patent Literature 2] Japanese Unexamined Patent Application Publication No. 2013-196639

SUMMARY OF INVENTION

Technical Problem

It is difficult for the driving support apparatus disclosed in the Patent Literature 1 to balance (achieve) a calculation of the appropriate stop position (namely, a calculation of the stop position that is not so away from an actual positon of the stop line) and an securement of an opportunity to control the vehicle to stop at the calculated stop position. This is a technical problem for the driving support apparatus disclosed in the Patent Literature 1. The reason is below described.

There is a possibility that a position at which the road sign (alternatively, any sign requesting the vehicle to stop) is located is away from the actual position of the stop line. Thus, if the stop position is calculated on the basis of the road sign, there is a possibility that the calculated stop position is away from the position of the actual stop line. On the other hand, the stop line (alternatively, any sign representing the position at which the vehicle should stop) represents the position at which the vehicle should stop, and thus, there is less possibility that the stop position calculated on the basis of the stop line is away from the position of the actual stop line. However, the stop line is not always detected. For example, there is a case where the stop line is not detected although the road sign is already detected. Thus, the opportunity to calculate the stop position on the basis of the stop line is limited. Namely, the opportunity to control the vehicle to stop at the stop position calculated on the basis of the stop line is limited.

Moreover, not only the driving support apparatus disclosed in the Patent Literature 1 but also a driving support apparatus that is configured to perform a driving support for automatically decelerating the vehicle to a target speed before the vehicle reaches the target position has the same technical problem that it is difficult to balance the calculation of the appropriate target position and the securement of the opportunity to control the vehicle to decelerate to a target speed before the vehicle reaches the target position.

The above described technical problem is one example of the technical problem to be solved by the present invention. It is therefore an object of the present invention to provide, for example, a driving support apparatus that is configured to perform a driving support for automatically decelerating a vehicle to a target speed before the vehicle reaches a target position, and especially, that is configured to balance the calculation of the appropriate target position and the securement of the opportunity to control the vehicle by the driving support.

Solution to Problem

One aspect of a driving support apparatus of the present invention is a driving support apparatus having: a setting device that is configured to set a first target position on the basis of a detected first sign object, if the first sign object is detected ahead of a vehicle, the first sign object requesting the vehicle to stop or decelerate; and a supporting device that is configured to perform a first deceleration control for decelerating the vehicle to a first target speed before the vehicle reaches the first target position, if a second sign object that is placed to be associated with the first sign object and that represents a position at which the vehicle should complete stopping or decelerating is detected ahead of the vehicle during a period when the first decelerating control is performed, (i) the setting device sets a second target position on the basis of the detected second sign object and (ii) the supporting device performs a second decelerating control for decelerating the vehicle to a second target speed before the vehicle reaches the second target position, instead of the first decelerating control.

DESCRIPTION OF EMBODIMENTS

Hereinafter, with reference to drawings, one embodiment of the driving support apparatus of the present invention will be described. In the following description, a vehicle 1 to which one embodiment of the driving support apparatus of the present invention is adapted will be described.

(1) Structure of Vehicle 1

Figure 1:
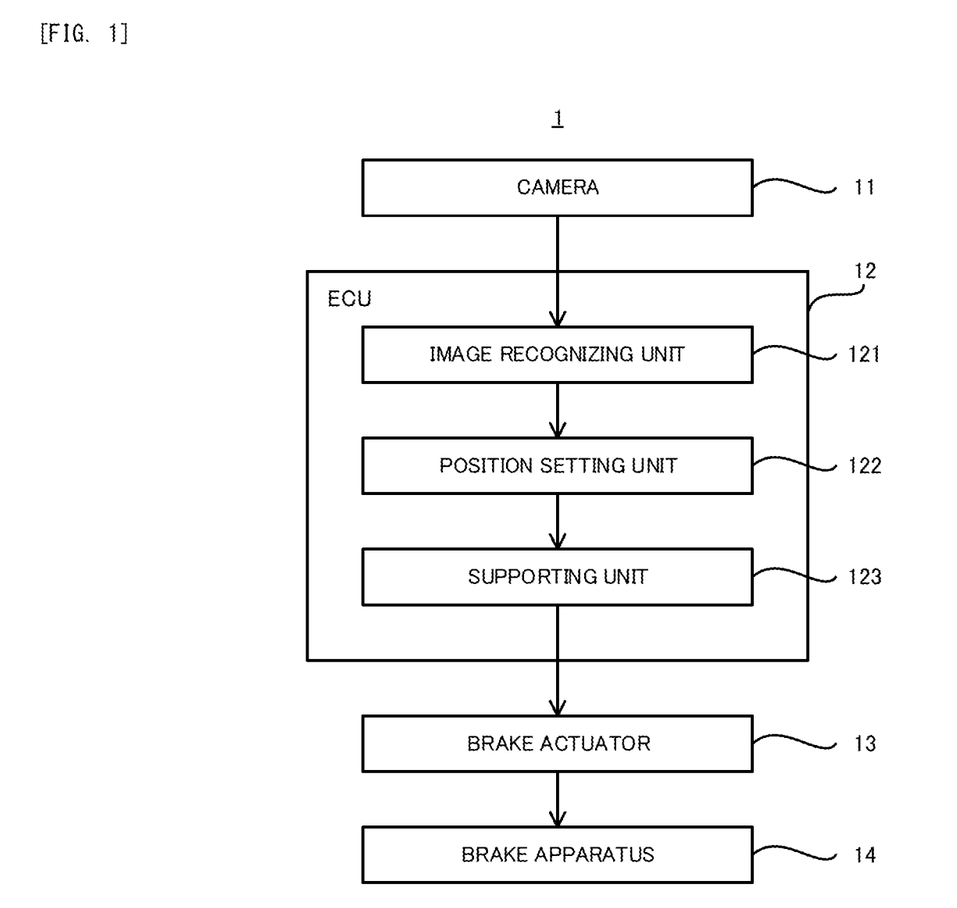
FIG. 1 is a block diagram that illustrates a structure of a vehicle in a present embodiment.

Firstly, with reference to FIG. 1, the structure of the vehicle 1 in the present embodiment will be explained. As illustrated in FIG. 1, the vehicle 1 has: a camera 11, an ECU (Electronic Control Unit) 12 that is one example of a "driving support apparatus" in a below described additional statement; a brake actuator 13; and a brake apparatus 14.

The camera 11 is an imaging device that is configured to image (capture) an area ahead of the vehicle 1. An image captured by the camera 11 (namely, an image that represents a circumstance ahead of the vehicle 1) is outputted from the camera 11 to the ECU 12.

The ECU 12 is configured to control entire operation of the vehicle 1. Especially in the present embodiment, the ECU 12 is configured to perform a driving support for stopping the vehicle 1 at a target position. In order to perform the driving support, the ECU 12 includes, as processing blocks that are logically realized in the ECU 12 or processing circuits that are physically realized in the ECU 12, an image recognizing unit 121, a position setting unit 122 that is one example of a "setting device" in the below described additional statement and a supporting unit that is one example of a "supporting device" in the below described additional statement. The operation of each of the image recognizing unit 121, the position setting unit 122 and the supporting unit 123 will be briefly described here, although it is described later in detail (see FIG. 2 and so on). The image recognizing unit 121 is configured to detect a stop sign 21 and a stop line 22 from the image captured by the camera 11. The stop sign 21 is a road sign that requests the vehicle 1 to stop. The stop line 22 is a road mark that is drawn on the road to represent a position at which the vehicle 1 should stop. Note that the stop sign 21 and the stop line 22 are examples of a "first sign object" and a "second sign object" in the below described additional statement, respectively. The position setting unit 122 is configured to set the target position at which the vehicle 1 should stop on the basis of the detection result of the image recognizing unit 121. The supporting unit 123 is configured to control the brake actuator 13 to stop the vehicle 1 at the target position.

The brake actuator 13 is configured to control the brake apparatus 14 that is configured to brake a non-illustrated wheel in order to apply a braking force to the vehicle 1 under the control of the supporting unit 123. As a result, the driving support that is performed by the supporting unit 123 allows the vehicle 1 to stop at the target position without requiring an operation by the driver. Alternatively, the driving support that is performed by the supporting unit 123 assists an operation of a brake pedal by the driver so that the vehicle 1 stops at the target position.

(2) Driving Support Performed by ECU 12

Figure 2:
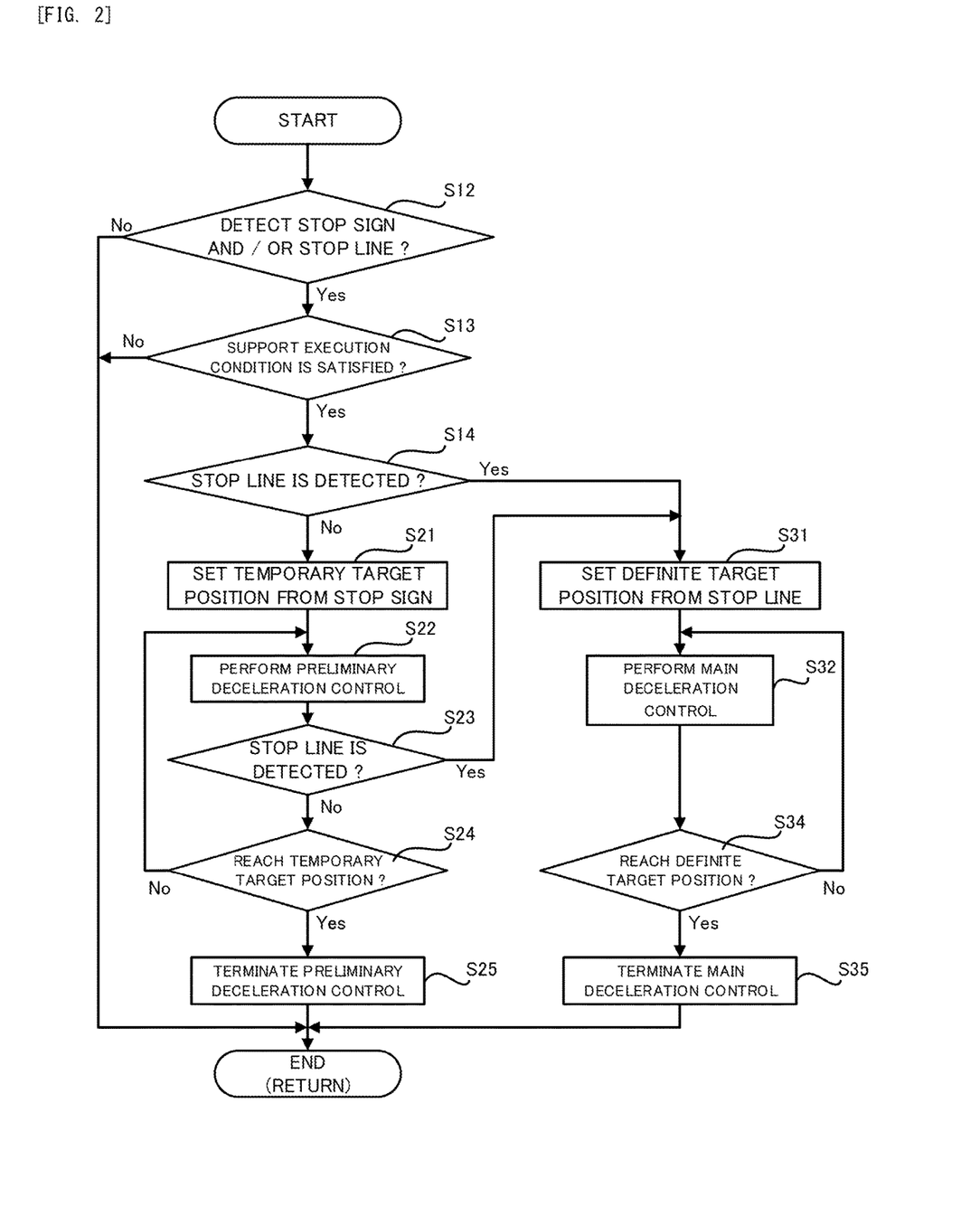
FIG. 2 is a flowchart that illustrates a flow of a driving support.

Next, with reference to FIG. 2, the driving support that is performed by the ECU 12 will be described. FIG. 2 is a flowchart that illustrates a flow of the driving support that is performed by the ECU 12.

As illustrated in FIG. 2, firstly, the position setting unit 122 determines whether or not at least one of the stop sign 21 and the stop line 22 is detected by the image recognizing unit 121 (a step S12). Note that the camera 11 keeps imaging the area ahead of the vehicle 1 during a period when the driving support illustrated in FIG. 2 is performed. Thus, the image recognizing unit 121 keeps performing a process of detecting the stop sign 21 and the stop line 22 from the image captured by the camera 11 during the period when the driving support illustrated in FIG. 2 is performed.

As a result of the determination at the step S12, if it is determined that both of the stop sign 21 and the stop line 22 are not detected (the step S12: No), the ECU 12 terminates the driving support illustrated in FIG. 2. When the ECU 12 terminates the driving support illustrated in FIG. 2, the ECU 12 starts the driving support illustrated in FIG. 2 again after a predetermined period has elapsed.

On the other hand, as a result of the determination at the step S12, if it is determined that at least one of the stop sign 21 and the stop line 22 is detected (the step S12: Yes), the position setting unit 122 determines whether or not a support execution condition is satisfied (a step S13). The support execution condition is a condition that should be satisfied in order to actually start to control the vehicle 1 to stop at the target position. The support execution condition includes a condition that the vehicle 1 reaches a position at which the detected stop sign 21 is placed or the detected stop line 22 is drawn within a predetermined time under a condition where the vehicle 1 maintains current speed, for example.

As a result of the determination at the step S13, if it is determined that the support execution condition is not satisfied (the step S13: No), the ECU 12 terminates the driving support illustrated in FIG. 2 without controlling the vehicle 1 to stop at the target position.

On the other hand, as a result of the determination at the step S13, if it is determined that the support execution condition is satisfied (the step S13: Yes), the ECU 12 starts to control the vehicle 1 to stop at the target position. Specifically, firstly, the position setting unit 122 determines whether or not the stop line 22 is detected by the image recognizing unit 121 (a step S14).

As a result of the determination at the step S14, if it is determined that the stop line 22 is not detected by the image recognizing unit 121 (the step S14: No), the image recognizing unit 121 has not detected the stop line 22 yet although the image recognizing unit 121 has already detected the stop sign 21. Note that the stop sign 21 is a three dimensional structure and the stop line 22 is a two dimensional mark drawn on the road, and thus there is a relatively high possibility that the camera 11 images the stop sign 21 before the camera 11 images the stop line 22. Alternatively, there is a relatively high possibility that the image recognizing unit 121 detects the stop sign 21 before the image recognizing unit 121 detects the stop line 22. Thus, the case where the image recognizing unit 121 has not detected the stop line 22 yet although the image recognizing unit 121 has already detected the stop sign 21 occurs to some degree.

Figure 3:
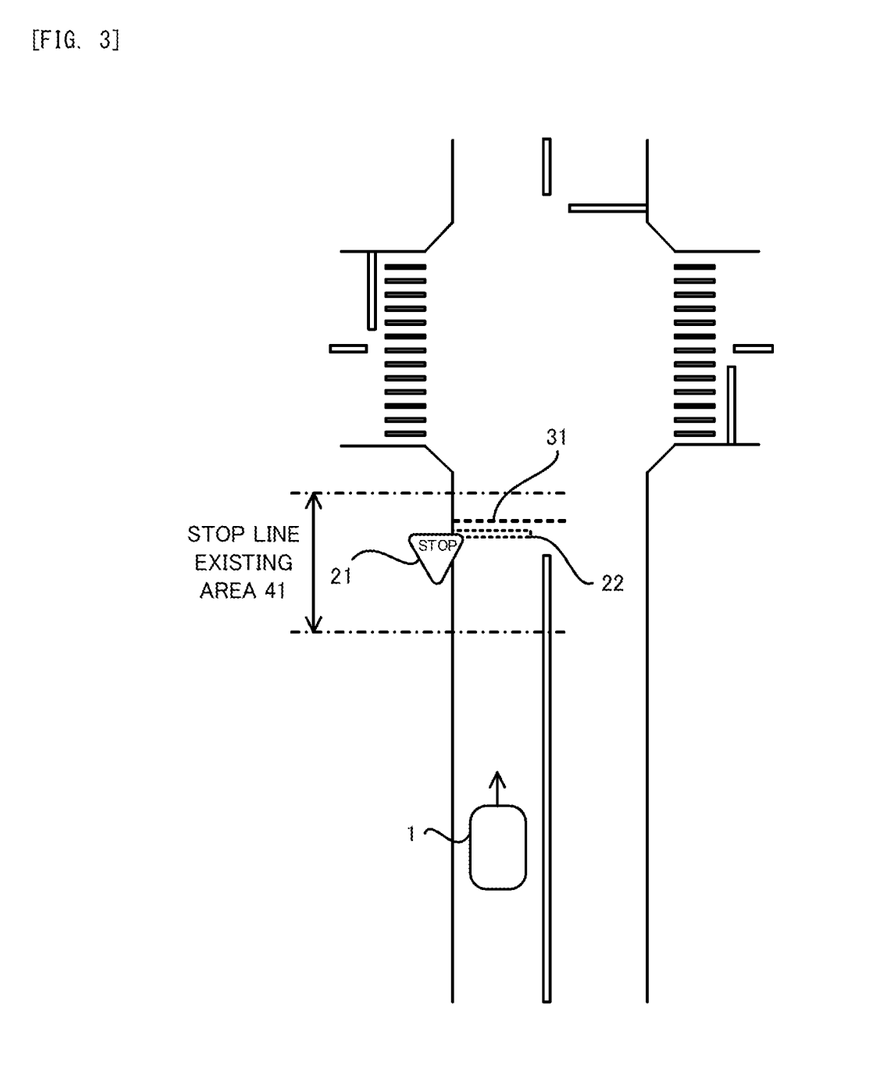
FIG. 3 is a planar view that illustrates one example of a temporary target position.

In this case, the position setting unit 122 sets a temporal target position 31 that represents a position at which the vehicle 1 should stop on the basis of the detected stop sign 21 (a step S21). For example, there is a high possibility that the stop line 22 that is associated with the stop sign 21 is drawn in a stop line existing area 41 that is set on the road on the basis of the position of the stop sign 21. Thus, as illustrated in FIG. 3 that is a planar view illustrating the stop sign 21 and the stop line 22 placed/drawn near an intersection at which two road intersect with each other, the position setting unit 122 sets the stop line existing area 41 on the basis of the detected stop sign 21 and then sets the temporary target position 31 at any position in the set stop line existing area 41, for example. For example, if the detected stop sign 21 is located in the stop line existing area 41, the position setting unit 122 may set the temporary target position 31 at the position of the detected stop sign 21. For example, the position setting unit 122 may set the temporary target position 31 at a position that is away from the position of the stop sign 21 toward the near side (namely, toward the vehicle 1) in the stop line existing area 41. For example, the position setting unit 122 may set the temporary target position 31 at a position that is away from the position of the stop sign 21 toward the farther side (namely, toward the opposite side of the vehicle 1) in the stop line existing area 41. Note that FIG. 3 illustrate one example of the temporary target position 31 that is set to be away from the position of the stop sign 21 toward the farther side. Moreover, the stop line existing area 41 is one example of a "specific area" in the below described additional statement.

The stop line existing area 41 is an area that ranges on the road from a first position that is away from the detected stop sign 21 by a first predetermined distance toward the near side (or toward the farther side) to a second position that is away from the detected stop sign 21 by a second predetermined distance toward the farther side (or toward the near side), for example. It is preferable that the position setting unit 122 store an information that is necessary for setting the stop line existing area 41 on the basis of the detected stop sign 21 (for example, an information relating to the above described first predetermined distance and the second predetermine distance) in advance.

It is preferable that the position setting unit 122 set the temporary target position 31 by using the adjustable (in other words, changeable) stop line existing area 41. For example, there is a possibility that a drawn position at which the stop line 22 associated with the stop sign 21 is actually drawn varies depending on a characteristics of the road on which the stop sign 21 is placed and the stop line 22 is drawn. Each of a width of the road (or a lane on the road), the number of the lane(s) on the road, a curvature radius of the road and the like is one example of the characteristics of the road. Thus, the position setting unit 122 may adjust (change) the stop line existing area 41 on the basis of the characteristics of the road on which the vehicle 1 travels. For example, the position setting unit 122 may adjust at least one of a size of the stop line existing area 41, a shape (a planar shape on the road) of the stop line existing area 41, a position of an edge part of the stop line existing area 41 and the like. Alternatively, for example, there is a possibility that the drawn position at which the stop line 22 associated with the stop sign 21 is actually drawn varies for every country. Thus, the position setting unit 122 may adjust the stop line existing area 41 depending on which country the vehicle 1 travels. However, the position setting unit 122 may set the temporary target position 31 by using the fixed stop line existing area 41.

After the temporary target position 31 is set, the supporting unit 123 performs a preliminary deceleration control for decelerating the vehicle 1 to stop the vehicle 1 at the temporary target position 31 that is set at the step S21 (a step S22). Namely, the supporting unit 123 performs the preliminary deceleration control for decreasing the speed of the vehicle 1 to zero before the vehicle 1 reaches the temporary target position 31 that is set at the step S21 (in other words, at the timing at which the vehicle 1 reaches the temporary target position 31) (the step S22). Note that the temporary target position 31 and the preliminary deceleration control are examples of a "first target position" and a "first deceleration control" in the below described additional statement.

Specifically, the supporting unit 123 calculates a distance d1 from a current position of the vehicle 1 to the temporary target position 31. Then, the supporting unit 123 calculates a required deceleration rate D1 that is necessary for the vehicle 1 to stop at the temporary target position 31 on the basis of the calculated distance d1 and the current speed V1 of the vehicle 1. Note that the supporting unit 123 may calculate the required deceleration rate D1 by using a formula $D1=V1^2/d1$, if the preliminary deceleration control decelerates the vehicle 1 at a constant deceleration rate. Then, the supporting unit 123 controls the brake actuator 13 to apply to the vehicle 1 the braking force that allows the vehicle 1 to decelerate at the calculated required deceleration rate D1. As a result, the vehicle 1 decelerates at the calculated required deceleration rate D1.

During a period when the preliminary deceleration control is performed, the position setting unit 122 determines whether or not the stop line 22 that has not detected before now is newly detected by the image recognizing unit 121 (a step S23). Here, the position setting unit 122 determines whether or not the image recognizing unit 121 newly detects the stop line 22 that is drawn on the road to be associated with the stop sign 21 used to calculate the temporary target position 31 at the step S21.

As a result of the determination at the step S23, if it is determined that the stop line 22 is not detected by the image recognizing unit 121 (the step S23: No), the supporting unit 123 determines whether or not the vehicle 1 reaches the temporary target position 31 (a step S24). As a result of the determination at the step S24, if it is determined that the vehicle 1 reaches the temporary target position 31 (the step S24: Yes), the ECU 12 terminates the preliminary deceleration control (a step S25) and terminates the driving support illustrated in FIG. 2. On the other hand, as a result of the determination at the step S24, if it is determined that the vehicle 1 does not reach the temporary target position 31 yet (the step S24: No), the ECU 12 continues the preliminary deceleration control.

Figure 4:
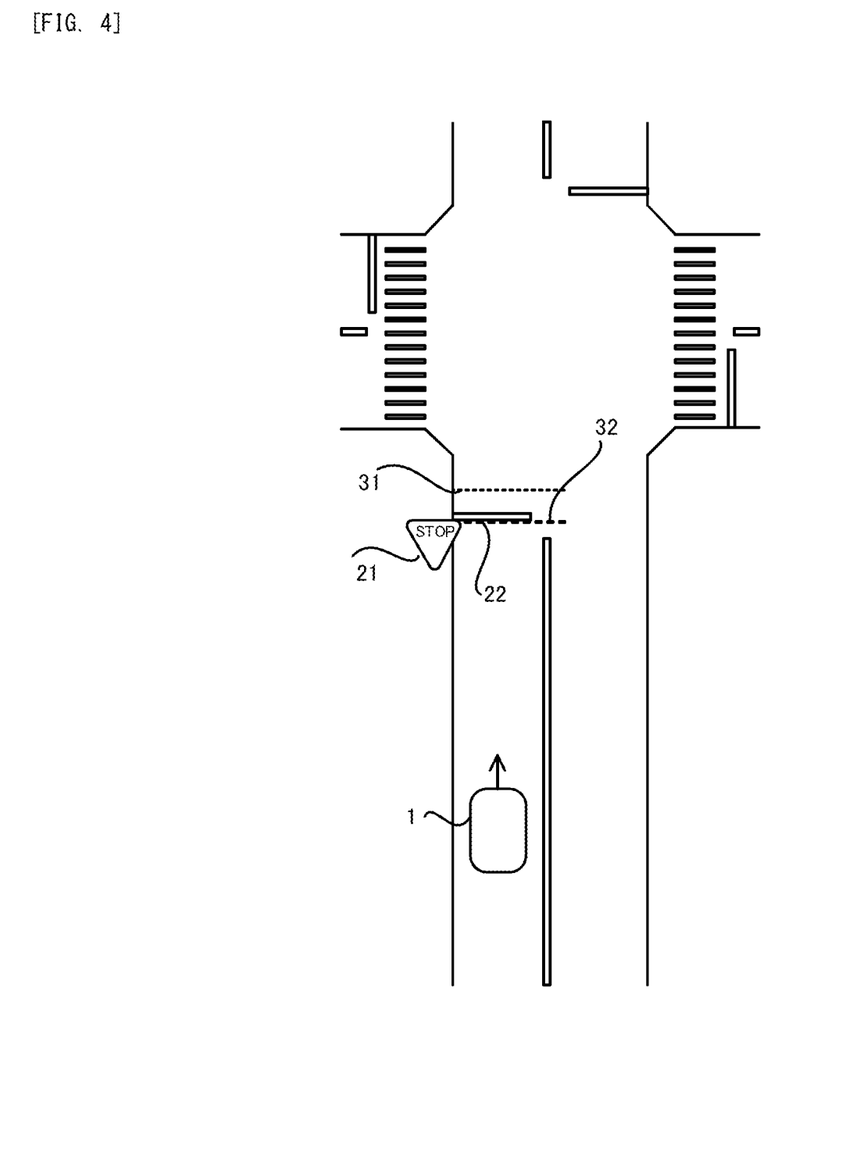
FIG. 4 is a planar view that illustrates one example of a definite target position.

On the other hand, as a result of the determination at the step S23, if it is determined that the stop line 22 is newly detected by the image recognizing unit 121 (the step S23: Yes), the position setting unit 122 sets a definite target position 32 that represents a position at which the vehicle 1 should stop on the basis of the detected stop line 22 (a step S31). Specifically, as illustrated in FIG. 4, the position setting unit 122 sets the definite target position 32 at the position of the detected stop line 22. However, the position setting unit 122 may set the definite target position 32 at a position that is away from the position of the detected stop line 22 toward the near side or the farther side.

After the definite target position 32 is set, the supporting unit 123 performs a main deceleration control for decelerating the vehicle 1 to stop the vehicle 1 at the definite target position 32 that is set at the step S31 (a step S32). Namely, the supporting unit 123 performs the main deceleration control for decreasing the speed of the vehicle 1 to zero before the vehicle 1 reaches the definite target position 32 that is set at the step S31 (in other words, at the timing at which the vehicle 1 reaches the definite target position 32) (the step S22). Note that the definite target position 32 and the main deceleration control are examples of a "second target position" and a "second deceleration control" in the below described additional statement.

Specifically, the supporting unit 123 calculates a distance d2 from the current position of the vehicle 1 to the definite target position 32. Then, the supporting unit 123 calculates a required deceleration rate D2 that is necessary for the vehicle 1 to stop at the definite target position 32 on the basis of the calculated distance d2 and the current speed V2 of the vehicle 1. Note that the supporting unit 123 may calculate the required deceleration rate D2 by using a formula $D2=V2^2/d2$, if the main deceleration control decelerates the vehicle 1 at a constant deceleration rate. Then, the supporting unit 123 controls the brake actuator 13 to apply to the vehicle 1 the braking force that allows the vehicle 1 to decelerate at the calculated required deceleration rate D2. As a result, the vehicle 1 decelerates at the calculated required deceleration rate D2.

During a period when the main deceleration control is performed, the supporting unit 123 determines whether or not the vehicle 1 reaches the definite target position 32 (a step S34). As a result of the determination at the step S34, if it is determined that the vehicle 1 reaches the definite target position 32 (the step S34: Yes), the ECU 12 terminates the main deceleration control (a step S35) and terminates the driving support illustrated in FIG. 2. On the other hand, as a result of the determination at the step S34, if it is determined that the vehicle 1 does not reach the definite target position 32 yet (the step S34: No), the ECU 12 continues the main deceleration control.

On the other hand, as a result of the determination at the step S14, if it is determined that the stop line 22 is detected by the image recognizing unit 121 (the step S14: Yes), the stop line 22 that is necessary for setting the definite target position 32 is already detected although the temporary target position 31 is not yet set on the basis of the stop sign 21 (namely, the preliminary deceleration control is not yet performed). In this case, the ECU 12 starts to perform the main deceleration control without performing the preliminary deceleration control (the step S31 to the step S35).

(3) Technical Effect

As described above, firstly in the present embodiment, the temporary target position 31 is set on the basis of the stop sign 21. The stop sign 21 is the three dimensional structure. Thus, the stop sign 21 is recognizable more easily from a distance than the stop line 22. Thus, in the present embodiment, not only the main deceleration control but also the preliminary deceleration control are performed, compared to a first comparison in which the temporary target position 31 is not set on the basis of the stop sign 21 (namely, only the definite target position 32 is set on the basis of the stop line 22). Namely, in the present embodiment, the ECU 12 is allowed to control (namely, decelerate) the vehicle 1 by the preliminary deceleration control before the stop line 22 is detected. Thus, in the present embodiment, it is possible to secure more opportunity to control (namely, decelerate) the vehicle 1, compared to the first comparison example, because the preliminary deceleration control is additionally performed. Moreover, in the present embodiment, if the stop line 22 is detected during the period when the preliminary deceleration control is performed by using the temporary target position 31, the definite target position 32 is set on the basis of the stop line 22. Thus, in the present embodiment, it is possible to set the definite target position 32 at (or near) the position at which the stop line 22 is drawn, compared to a second comparison example in which the definite target position 32 is not set on the basis of the stop line 22 (namely, only the temporary target position 31 is set on the basis of the stop sign 21). Namely, in the present embodiment, it is possible to appropriately set the definite target position 32, compared to the second comparison example. As a result, the present embodiment is allowed to balance the calculation of the appropriate target position that represents the position at which the vehicle 1 should stop and the securement of the opportunity to control the vehicle 1 by the preliminary deceleration control and the main deceleration control, by setting the temporary target position 31 and then setting the definite target position 32.

Moreover, in the present embodiment, if the stop line 22 is already detected before the preliminary deceleration control is performed (the step S14 in FIG. 2: Yes), ECU 12 starts to perform the main deceleration control without performing the preliminary deceleration control. There is a high possibility that the case where the stop line 22 is already detected before the preliminary deceleration control is performed occurs when the speed of the vehicle 1 is relatively small. The reason is as follows. If the stop sign 21 is detected and the stop line 22 is not detected, there is a possibility that the support execution condition that the vehicle 1 reaches the position at which the detected stop sign 21 is placed within the predetermined time is not satisfied, because the stop sign 21 is detectable from a distance. In this case, if the speed of the vehicle 1 is relatively small, there is a relatively high possibility that the stop line 22 is detected before the support execution condition that the vehicle 1 reaches the position at which the detected stop sign 21 is placed within the predetermined time is satisfied, because the vehicle 1 travels relatively slowly. As a result, the case where the stop line 22 is already detected at the timing when the support execution condition is satisfied occurs. On the other hand, if the speed of the vehicle 1 is relatively large, there is a relatively high possibility that the support execution condition that the vehicle 1 reaches the position at which the detected stop sign 21 is placed within the predetermined time is satisfied before the stop line 22 is detected, because the vehicle 1 travels relatively fast. Thus, if the speed of the vehicle 1 is relatively large, there is a high possibility that the main deceleration control is performed after the preliminary deceleration control is performed. Namely, in the present embodiment, there is a high possibility that the main deceleration control is performed without the preliminary deceleration control being performed if the speed of the vehicle 1 is relatively small and the main deceleration control is performed after the preliminary deceleration control is performed if the speed of the vehicle 1 is relatively large. As a result, in the present embodiment, it is possible to reduce a processing load of the ECU 12, compared to a third comparison example in which the preliminary deceleration control is always performed before the main deceleration control is performed, because the ECU 12 does not necessarily perform the preliminary deceleration control when the speed of the vehicle 1 is relatively small. Alternatively, the ECU 12 may determine whether or not the speed of the vehicle 1 is relatively small (for example, smaller than a predetermined speed) instead of the determination of the step S14 in FIG. 2, and then may perform the main deceleration control without performing the preliminary deceleration control if it is determined that the speed of the vehicle 1 is relatively small and may perform the main deceleration control after performing the preliminary deceleration control if it is determined that the speed of the vehicle 1 is relatively large, in order to surely achieve the technical effect of the processing load of the ECU 12 being reduced.

(4) Modified Example

(4-1) First Modified Example

Figure 5:
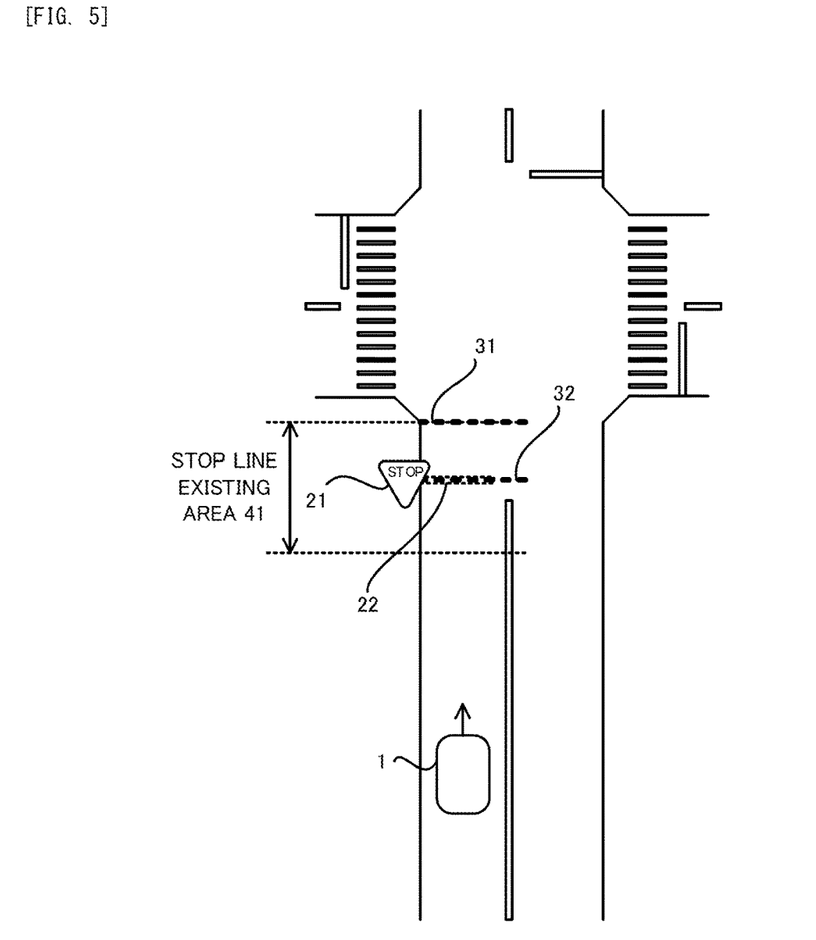
FIG. 5 is a planar view that illustrates one example of a temporary target position.
Figure 6:
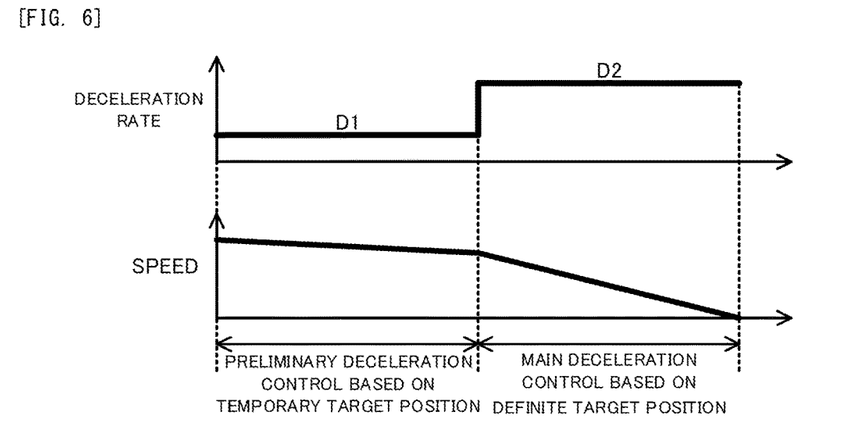
FIG. 6 is a timing chart that illustrates a temporal transition of a deceleration rate and speed of the vehicle when a main deceleration control is performed after a preliminary deceleration control is performed.

In the first modified example, as illustrated in FIG. 5, the position setting unit 122 sets the temporary target position 31 at edge portion of the stop line existing area 41 that is farthest from the vehicle 1. As a result, as illustrated in FIG. 5, there is a relatively high possibility that the temporary target position is set at the farther side from the definite target position 32 (namely, the position of the stop line 22). If the temporary target position is set at the farther side from the definite target position 32, the required deceleration rate D1 the is necessary for the vehicle 1 to stop at the temporary target position 31 is smaller than the required deceleration rate D2 the is necessary for the vehicle 1 to stop at the definite target position 32 as illustrated in FIG. 6. As a result, the vehicle 1 firstly decelerates relatively gently by the preliminary deceleration control, then decelerates relatively rapidly by the main deceleration control and then stops at the definite target position 32. This deceleration aspect of the vehicle 1 is similar to the deceleration aspect of the vehicle 1 that is realized by the driver to operate the brake pedal in order to stop the vehicle 1 at the definite target position 32. This is because the driver tends to decelerate the vehicle relatively gently by pedaling the brake pedal relatively gently at first and then pedal the brake pedal more as the vehicle 1 approaches the definite target position 32 more to stop the vehicle 1, when the driver operates the brake pedal in order to stop the vehicle 1 at the definite target position 32. Thus, in the first modified example, the preliminarily deceleration control and the main deceleration control allow the vehicle 1 to decelerate in the deceleration aspect that reduces an uncomfortable feeling of the driver.

Alternatively, there is a higher possibility that the temporary target position is set at the farther side from the definite target position 32 in the case where the temporary target position is set at the farther side than the position of the stop sign 21, compared to the case where the temporary target position is set at the position of the stop sign 21 or at the near side from the position of the stop sign 21. Thus, even in the case where the temporary target position is set at the farther side than the position of the stop sign 21, it is possible to achieve, to some degree, the technical effect that the vehicle 1 is allowed to decelerate in the deceleration aspect that reduces an uncomfortable feeling of the driver.

(4-2) Second Modified Example

In the second modified example, the position setting unit 122 sets the temporary target position 31 on the basis of a road information relating to the road on which the vehicle 1 travels, in addition to the stop sign 21 detected by the image recognizing unit 121. The road information includes an information relating to the road that is useful to estimate the position of the stop line 22. For example, an information relating to a shape of an intersection ahead of the stop sign 21 is the useful information for estimating the position of the stop line 22, because the stop line 22 is drawn in accordance with the shape of the intersection. Note that the road information may be obtained by the image recognizing unit 121 from the image captured by the camera 11.

According to the second modified example, there is a higher possibility that the temporary target position 31 is set at the position nearer to the definite target position 32, compared to the case where the temporary target position 31 is set on the basis of not the road information but the stop sign 21.

Note that the position setting unit 122 may set the temporary target position 31 on the basis of the stop sign 21, then may newly set the temporary target position 31 on the basis of the stop sign 21 and the road information after the road information is obtained, and then may set the definite target position 32 on the basis of the stop line 22 after the stop line 22 is detected. As a result, the position setting unit 122 is allowed to update the temporary target position 31 so that new temporary target position 31 that is estimated to be closer to the position of the actual stop line 22 is set. Alternatively, the position setting unit 122 may set the temporary target position 31 on the basis of the stop sign 21, then may newly set the temporary target position 31 on the basis of the stop sign 21 and newly detected sign object after the sign object that requests the vehicle 1 to stop is newly detected, and then may set the definite target position 32 on the basis of the stop line 22 after the stop line 22 is detected, in addition to or instead of using the road information, in order to newly set the temporary target position 31 that is closer to the position of the actual stop line 22. Namely, the position setting unit 122 may set a plurality of temporary target positions 31 (especially, a plurality of temporary target positions 31 each of which increases possibility that the temporary target position 31 is closer to the definite target position 32 than ever before) on the basis of a plurality of any parameters.

(4-3) Another Modified Example

In the above described description, the position setting unit 122 sets the temporary target position 31 at any positon in the stop line existing area 41 that is set on the basis of a sign position at which the stop sign 21 is placed. However, the position setting unit 122 may set the temporary target position 31 without using the stop line existing area 41.

In the above described description, the image recognizing unit 121 detects the stop sign 21 that requests the vehicle 1 to stop. However, the image recognizing unit 121 may detect any sign object (for example, the road sign, the road mark, any structural object and the like) that requests the vehicle 1 to stop, in addition to or instead of the stop sign 21. Each of the signal having a light color that requests the vehicle 1 to stop (for example, the read signal or the yellow signal in Japan), the road sign other than the stop sign 21 that requests the vehicle 1 to stop, the road mark having text characters (for example, the text characters such as "STOP") drawn on the road at the near side of the stop line 22, a crash barrier or a guard rail (especially, at a T-shaped intersection) and the like is one example of the sign object that requests the vehicle 1 to stop. Even in this case, the above described technical effect can be achieved if the temporary target position 31 is set on the basis of the detected sign object. Namely, since the temporary target position 31 is still set on the basis of the sign object, and thus it is possible to secure more opportunity to control (namely, decelerate) the vehicle 1, because the preliminary deceleration control is additionally performed. Note that any sign object that requests the vehicle 1 to stop is one example of the "first sign object" in the below described additional statement.

In the above described description, the image recognizing unit 121 detect the stop line 22 that requests the vehicle 1 to stop. However, the image recognizing unit 121 may detect any sign object (for example, the road sign, the road mark, any structural object and the like) that represents the position at which the vehicle 1 should stop, in addition to or instead of the stop line 22. Each of a crosswalk, a road mark that represents a stop-restricted area, a road sign that indicates the position of the stop line 22 and that is placed at the side of the road and the like is one example of the sign object that represents the position at which the vehicle 1 should stop. Even in this case, the above described technical effect can be achieved if the definite target position 32 is set on the basis of the detected sign object. Namely, since the definite target position 32 is still set on the basis of the sign object, and thus it is possible to appropriately set the definite target position 32. Note that any sign object that represents the position at which the vehicle 1 should stop is one example of the "second sign object" in the below described additional statement.

In the above described description, the deceleration rate of the vehicle 1 is constant during the preliminary deceleration control. However, the supporting unit 123 may decelerate the vehicle 1 so that the deceleration rate of the vehicle 1 varies during the preliminary deceleration control. For example, the supporting unit 123 may decelerate the vehicle 1 so that the deceleration rate of the vehicle 1 varies during the preliminary deceleration control in the same manner as the deceleration rate of the vehicle 1 that is realized by the driver to operate the brake pedal (for example, an average of the deceleration rates that are realized by many drivers to operate the brake pedal). The deceleration rate of the vehicle 1 also varies during the main deceleration control, as with the preliminary deceleration control.

The ECU 12 may perform a driving support for decelerating the vehicle 1 to a target speed (for example, 5 km/h to 10 km/h) before the vehicle 1 reaches the target position, in addition to or instead of the driving support for stopping the vehicle 1 at the target position. Namely, the ECU 12 may perform the driving support for decelerating the vehicle 1 so that the speed of the vehicle 1 is equal to the target speed at the timing when the vehicle 1 reaches the target position. Note that the driving support for decelerating the vehicle 1 to the target speed before the vehicle 1 reaches the target position is equivalent to the driving support for stopping the vehicle 1 at the target position, if the target speed is zero.

It is preferable that the target position (namely, the temporary target position 31 and the definite target position 32) be set by the above described operation even in the case where the ECU 12 performs the driving support for decelerating the vehicle 1 to the target speed before the vehicle 1 reaches the target position. Namely, it is preferable that the ECU 12 firstly perform the driving support for decelerating the vehicle 1 to a first target speed before the vehicle 1 reaches the temporary target position 31 and then perform the driving support for decelerating the vehicle 1 to a second target speed that is same as or different from the first target speed before the vehicle 1 reaches the definite target position 32. As a result, the above described technical effect can be achieved even in the case where the ECU 12 performs the driving support for decelerating the vehicle 1 to the target speed before the vehicle 1 reaches the target position.

If the ECU 12 performs the driving support for decelerating the vehicle 1 to the target speed before the vehicle 1 reaches the target position, the image recognizing unit 121 may detect any sign object (typically, a structural object) that requests the vehicle 1 to decelerate, in addition to or instead of the stop sign 21 (alternatively, any sign object that requests the vehicle 1 to stop). Each of the road sign (or the road mark) that requests the vehicle 1 to slow down, the road sign (or the road mark) that indicates the presence of the school and the like is one example of any sign object that requests the vehicle 1 to decelerate. Even in this case, the above described technical effect can be achieved if the temporary target position 31 is set on the basis of the detected sign object.

If the ECU 12 performs the driving support for decelerating the vehicle 1 to the target speed before the vehicle 1 reaches the target position, the image recognizing unit 121 may detect any sign object that represents a position at which the vehicle 1 should complete decelerating, in addition to or instead of the stop line 22 (alternatively, any sign object that represents the position at which the vehicle 1 should stop). Even in this case, the above described technical effect can be achieved if the definite target position 32 is set on the basis of the detected sign object.

In the above described description, the stop sign 21 and the stop line 22 are detected from the image that represents the circumstance ahead of the vehicle 1 and that is captured by the camera 11. However, the stop sign 21 and the stop line 22 may be detected by another method. For example, the stop sign 21 and the stop line 22 may be detected by a detection result of a radar or a LIDAR (Light Detection and Ranging).

(5) Additional Statement

Relating to the above described embodiment, following additional statements will be disclosed.

(5-1) Additional Statement 1

A driving support apparatus according to the additional statement 1 is a driving support apparatus having: a setting device that is configured to set a first target position on the basis of a detected first sign object, if the first sign object is detected ahead of a vehicle, the first sign object requesting the vehicle to stop or decelerate; and a supporting device that is configured to perform a first deceleration control for decelerating the vehicle to a first target speed before the vehicle reaches the first target position, if a second sign object that is placed to be associated with the first sign object and that represents a position at which the vehicle should complete stopping or decelerating is detected ahead of the vehicle during a period when the first decelerating control is performed, (i) the setting device sets a second target position on the basis of the detected second sign object and (ii) the supporting device performs a second decelerating control for decelerating the vehicle to a second target speed before the vehicle reaches the second target position, instead of the first decelerating control.

A driving support apparatus according to the additional statement 1 may be a driving support apparatus having a controller, the controller is programmed to: set a first target position on the basis of a detected first sign object, if the first sign object is detected ahead of a vehicle, the first sign object requesting the vehicle to stop or decelerate; and to perform a first deceleration control for decelerating the vehicle to a first target speed before the vehicle reaches the first target position, if a second sign object that is placed to be associated with the first sign object and that represents a position at which the vehicle should complete stopping or decelerating is detected ahead of the vehicle during a period when the first decelerating control is performed, (i) the controller is programmed to set a second target position on the basis of the detected second sign object and (ii) the controller is programmed to perform a second decelerating control for decelerating the vehicle to a second target speed before the vehicle reaches the second target position, instead of the first decelerating control.

The driving support apparatus according to the additional statement 1 firstly sets the first target position on the basis of the first sign object such as a road sign and a signal. Thus, the driving support apparatus according to the additional statement 1 is allowed to control the vehicle by the first deceleration control before the second sign object is detected. As a result, the driving support apparatus according to the additional statement 1 is allowed to secure more opportunity to control the vehicle by the first deceleration control and the second deceleration control, compared to a driving support apparatus in a first comparison example that does not set the first target position on the basis of the first sign object (namely, that sets only the second target position on the basis of the second sign object), because the driving support apparatus according to the additional statement 1 is allowed to perform not only the second deceleration control but also the first deceleration control. Moreover, the driving support apparatus according to the additional statement 1 sets the second target position on the basis of the second sign object, if the second sign object such as a stop line is detected during the period when the first deceleration control using the first target position is performed. Thus, the driving support apparatus according to the additional statement 1 is allowed to set the second target position at or near a position at which the vehicle should complete stopping or decelerating, compared to a driving support apparatus in a second comparison example that does not set the second target position on the basis of the second sign object (namely, that sets only the first target position on the basis of the first sign object). Namely, the driving support apparatus according to the additional statement 1 is allowed to appropriately set the second target position. As a result, the driving support apparatus according to the additional statement 1 is allowed to balance the calculation of the appropriate target position that represents the position at which the vehicle should complete stopping or decelerating and the securement of the opportunity to control the vehicle by the first deceleration control and the second deceleration control, by setting the temporary first target position and then setting the definite second target position.

Note that the first target speed may be same as or different from the second target speed. At least one of the first target speed and the second target speed may be zero or larger than zero.

(5-2) Additional Statement 2

A driving support apparatus according to the additional statement 2 is the driving support apparatus according to the additional statement 1, wherein a deceleration rate of the vehicle by the first decelerating control is smaller than a deceleration rate of the vehicle by the second decelerating control.

The driving support apparatus according to the additional statement 2 allows the vehicle to decelerate relatively gently at a relatively small deceleration rate and then to decelerate relatively rapidly at a relatively large deceleration rate. This deceleration aspect of the vehicle is similar to the deceleration aspect of the vehicle that is realized by a driver to operate a brake pedal in order to decelerate the vehicle to the target speed before the vehicle reaches the target position. Thus, the driving support apparatus according to the additional statement 2 is allowed to decelerate the vehicle in the deceleration aspect that reduces an uncomfortable feeling of the driver.

(5-3) Additional Statement 3

A driving support apparatus according to the additional statement 3 is the driving support apparatus according to the additional statement 1 or 2, wherein the setting device sets the first target position at a position that is farther than the detected first sign object from the vehicle.

A driving support apparatus according to the additional statement 3 may be the driving support apparatus according to the additional statement 1 or 2, wherein the controller is programmed to set the first target position at a position that is farther than the detected first sign object from the vehicle.

The driving support apparatus according to the additional statement 3 is allowed to increase the possibility that the first target position is set at a position that is farther than the second target position. As a result, there is an increased possibility that the deceleration rate of the vehicle by the first decelerating control is smaller than the deceleration rate of the vehicle by the second decelerating control. Therefore, the driving support apparatus according to the additional statement 3 is allowed to decelerate the vehicle in the deceleration aspect that reduces the uncomfortable feeling of the driver, as with the driving support apparatus according to the additional statement 2.

(5-4) Additional Statement 4

A driving support apparatus according to the additional statement 4 is the driving support apparatus according to any one of the additional statements 1 to 3, wherein the setting device sets the first target position at an area portion that is one portion of a specific area and that is the farthest portion from the vehicle, the specific area is set in advance on the basis of the detected first sign object as an area in which the second sign object is possibly placed to be associated with the detected first sign object.

A driving support apparatus according to the additional statement 4 may be the driving support apparatus according to any one of the additional statements 1 to 3, wherein the controller is programmed to set the first target position at an area portion that is one portion of a specific area and that is the farthest portion from the vehicle, the specific area is set in advance on the basis of the detected first sign object as an area in which the second sign object is possibly placed to be associated with the detected first sign object.

The driving support apparatus according to the additional statement 4 is allowed to increase the possibility that the first target position is set at a position that is farther than the second target position. As a result, there is an increased possibility that the deceleration rate of the vehicle by the first decelerating control is smaller than the deceleration rate of the vehicle by the second decelerating control. Therefore, the driving support apparatus according to the additional statement 4 is allowed to decelerate the vehicle in the deceleration aspect that reduces the uncomfortable feeling of the driver, as with the driving support apparatus according to the additional statement 2.

(5-5) Additional Statement 5

A driving support apparatus according to the additional statement 5 is the driving support apparatus according to any one of the additional statements 1 to 4, wherein the supporting device starts to perform the second deceleration control on the condition that the second sign object is detected during the period when the first deceleration control is performed, if a speed of the vehicle is larger than a predetermined speed, and the supporting device starts to perform the second deceleration control on the condition that the second sign object is detected regardless of the first deceleration control being performed or not, if the speed of the vehicle is smaller than the predetermined speed.

A driving support apparatus according to the additional statement 5 may be the driving support apparatus according to any one of the additional statements 1 to 4, wherein the controller is programmed to start to perform the second deceleration control on the condition that the second sign object is detected during the period when the first deceleration control is performed, if a speed of the vehicle is larger than a predetermined speed, and the controller is programmed to start to perform the second deceleration control on the condition that the second sign object is detected regardless of the first deceleration control being performed or not, if the speed of the vehicle is smaller than the predetermined speed.

The driving support apparatus according to the additional statement 5 is allowed to reduce a processing load of the driving support apparatus, because the driving support apparatus does not need to perform the first deceleration control when the speed of the vehicle is smaller than the predetermined speed.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2017-144189, filed on Jul. 26, 2017, the entire contents of which are incorporated herein by reference. In addition, the entire contents of the above described Patent Literatures 1 and 2 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A driving support apparatus, which involve such changes, are also intended to be within the technical scope of the present invention.

REFERENCE SIGNS LIST 1 vehicle
11 camera
12 ECU
121 image recognizing unit
122 position setting unit
123 supporting unit
13 brake actuator
14 brake apparatus
21 stop sign
22 stop line
31 temporary target position
32 definite target position
41 stop line existing area

The invention claimed is:

1. A driving support apparatus for a vehicle, comprising a controller:
the controller being programmed to:
perform a first deceleration control based on a detection of a first sign object which requests the vehicle to stop or decelerate; and
perform a second deceleration control when a second sign object is detected during a period when the first decelerating control is being performed,
the second sign object being placed so as to be associated with the first sign object.

2. The driving support apparatus according to claim 1, wherein
the second sign object represents a position at which the vehicle should stop.

3. The driving support apparatus according to claim 1, wherein
a deceleration rate by the first decelerating control is smaller than a deceleration rate by the second decelerating control.

4. The driving support apparatus according to claim 2, wherein
a deceleration rate by the first decelerating control is smaller than a deceleration rate by the second decelerating control.

5. The driving support apparatus according to claim 1, wherein the first sign object includes any three-dimensional structural object that requests the vehicle to stop.

6. The driving support apparatus according to claim 2, wherein the first sign object includes any three-dimensional structural object that requests the vehicle to stop.

7. A driving support method for a vehicle, using a controller, comprising:
performing a first deceleration control based on a detection of a first sign object which requests the vehicle to stop or decelerate; and
performing a second deceleration control when a second sign object is detected during a period when the first decelerating control is being performed,
the second sign object being placed so as to be associated with the first sign object.

8. The driving support method according to claim 7, wherein
the second sign object represents a position at which the vehicle should stop.

9. The driving support method according to claim 7, wherein
a deceleration rate by the first decelerating control is smaller than a deceleration rate by the second decelerating control.

10. The driving support method according to claim 8, wherein
a deceleration rate by the first decelerating control is smaller than a deceleration rate by the second decelerating control.

11. The driving support method according to claim 7, wherein the first sign object includes any three-dimensional structural object that requests the vehicle to stop.

12. The driving support method according to claim 8, wherein the first sign object includes any three-dimensional structural object that requests the vehicle to stop.

13. A non-transitory computer readable medium storing instructions that, when executed by at least one processor for a control device to perform a vehicle driving support, cause the at least one processor to:
perform a first deceleration control based on a detection of a first sign object which requests a vehicle to stop or decelerate; and
perform a second deceleration control when a second sign object is detected during a period when the first decelerating control is being performed,
the second sign object being placed so as to be associated with the first sign object.

14. The non-transitory computer-readable medium according to claim 13, wherein the second sign object represents a position at which the vehicle should stop.

15. The non-transitory computer-readable medium according to claim 13, wherein
a deceleration rate by the first decelerating control is smaller than a deceleration rate by the second decelerating control.

16. The non-transitory computer-readable medium according to claim 14, wherein
a deceleration rate by the first decelerating control is smaller than a deceleration rate by the second decelerating control.

17. The non-transitory computer-readable medium according to claim 13, wherein the first sign object includes any three-dimensional structural object that requests the vehicle to stop.

18. The non-transitory computer-readable medium according to claim 14, wherein the first sign object includes any three-dimensional structural object that requests the vehicle to stop.

\* \* \* \* \*